United States Patent Office 3,296,295
Patented Jan. 3, 1967

3,296,295
NORSTEROIDS
Pacifico Anthony Principe, South River, and Patrick A. Diassi, Westfield, N.J., assignors, by mesne assignments, to E. R. Squibb & Sons, Inc., New York, N.Y., a corporation of Delaware
No Drawing. Filed May 22, 1964, Ser. No. 369,624
3 Claims. (Cl. 260—488)

This invention relates to and has as its object the provision of physiologically active steroids and processes for their production.

More particularly, this invention relates to compounds of the formula

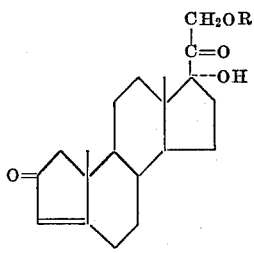

wherein R is selected from the group consisting of hydrogen and the acyl radical of a hydrocarbon carboxylic acid of less than ten carbon atoms such as a lower alkanoyl radical (e.g., acetyl), a monocyclic aryl lower alkanoyl radical (e.g., phenacetyl), or a monocyclic aroyl radical (e.g., benzoyl).

The final compounds of this invention may be prepared according to the process of this invention which entails subjecting A-norcortexone, the starting material, which may be prepared according to U.S. Patent 3,031,494, to the action of the microorganism *Tricothecium roseum* and/or enzymes thereof. The action of the enzymes can be utilized either by bringing together in an aqueous nutrient medium, the steroid, oxygen and enzymes of non-proliferating cells of *Tricothecium roseum*, or (preferably) by including the steroid in an aerated culture of the microorganism.

In general, the conditions of culturing *Tricothecium roseum* for the purpose of this invention are (except for the steroid to be oxidized) the same as those of culturing fungi for the production of antibiotics or organic acids; thus *Tricothecium roseum* is grown in contact with (in or on) a suitable nutrient medium in the presence of oxygen (air). A suitable nutrient medium essentially comprises a source of nitrogenous factors and an assimilable source of carbon and energy. The latter may be a carbohydrate (such as sucrose, molasses, glucose, maltose, starch or dextrin) and/or the steroid itself. Preferably, however, the medium includes an assimilable source of carbon and energy in addition to the steroid. The source of nitrogenous factors may be organic (e.g., soybean meal, corn steep liquor, meat extract, distiller solubles, peptones and/or yeast extract) or synthetic (i.e., composed of simple, synthesizable organic and inorganic compounds such as ammonium salts, alkali nitrates, amino acids or urea).

The product, A-norcortexolone, is isolated from the fermentation broth and crystallized by conventional procedures. A-norcortexolone may then be acylated, as by treatment with an acylating agent, e.g., acid anhydride or acyl halide, in a basic medium, e.g., pyridine or collidine to yield the 21-acyl derivatives thereof, which are also new compounds of this invention.

The compounds of this invention are physiologically active steroids possessing mineralocorticoid activity and thus can be employed instead of desoxycorticosterone, for example, in the treatment of Addison's disease, for which they can be administered in the same manner as desoxycorticosterone, for example, the dosage and/or concentration being adjusted for the relative potency of the particular steroid.

The invention may be further illustrated by the following examples:

Example 1

*A-norcortexolone.*—Surface growth from a two-week old agar slant of *Tricothecium roseum* (ATCC 12519), the slants containing as a nutrient medium (A): glucose, 10 g.; yeast extract, 2.5 g.; $K_2HPO_4$, 1 g.; Agar, 20 g.; distilled water to 1 liter is suspended in 5 ml. of 0.01% Dupanol aqueous solution (Merck Index, 7th edition (1960) p. 472). One milliliter portions of this suspension are used to inoculate fifteen 250 ml. Erlenmeyer flasks each containing 50 ml. of the following sterilized medium (B): dextrose, 10 g.; corn steep liquor, 6 g.; $NH_4H_2PO_4$, 3 g.; yeast extract, 2.5 g.; $CaCO_3$, 2.5 g.; distilled water to 1 liter. After 72 hours incubation at 25° C. with continuous rotary agitation (280 cycles per minute; 2-inch radius) 10% (v:v) transfers are made to forty-four 250 ml. Erlenmeyer flasks, each containing 50 ml. of freshly sterilized medium B plus 100 micrograms per ml. of A-norcortexone. The steroid was added by supplementing each flask with 0.25 ml. of a sterile solution of the steroid. A total of 220 mgs. are fermented. After 17 hours of further incubation, using the same conditions as described above, the contents of the flasks are pooled and filtered through a Seitz clarifying pad. The flasks, mycilium and pads are washed with successive 50 ml. portions of warm water. The combined filtrate and washings have a volume of 2700 ml. The filtrate is extracted three times with 900 ml. portions of chloroform which are combined, washed twice with 1 liter portions of water and evaporated to dryness in vacuo. The residue on crystallization from acetonehexane gives 85.4 mg. of A-norcortexolone having a melting point of 200–202° C.

Example 2

*A-norcortexolone 21-acetate.*—The mother liquor from the crystallization of Example 1 is evaporated to dryness and dissolved in a mixture of 3 ml. of dry pyridine and 1 ml. of acetic anhydride. After four hours at room temperature, ice water is slowly added and the mixture extracted with chloroform. The chloroform is washed successively with 2 N hydrochloric acid, water, 5% sodium bicarbonate and water and evaporated to dryness, in vacuo. Plate chromatography of the residue using Woelm neutral alumina as adsorbent and chloroform as the developing solvent gives a band at Rf 0.4 detectable with U.V. Elution of this band with ethyl acetate and evaporation of the solvent, in vacuo, gives a residue which on crystallization from acetone-hexane yields 50 mg. of A-norcortexolone 21-acetate having a melting point of 238–240° C., $[\alpha]_D^{22} + 51.2°$ (chloroform), $\lambda_{max.}^{alc.}$ 233 m$\mu$ ($\epsilon$=17,400).

*Analysis.*—Calc'd for $C_{22}H_{30}O_5$ (374.56): C, 70.56; H, 8.08. Found: C, 70.45; H, 8.17.

Example 3

*A-norcortexolone 21-acetate.*—Following the procedure for acetylation in Example 2, but substituting A-norcortexolone obtained in Example 1, for the mother liquor residue after crystallization there is obtained A-norcortexolone 21-acetate.

The invention may be variously otherwise embodied within the scope of the appended claims.

What is claimed is:
1. A compound of the formula

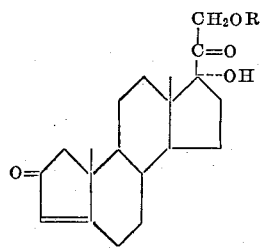

wherein R is selected from the group consisting of hydrogen and the acyl radical of a hydrocarbon carboxylic acid of less than ten carbon atoms.
2. The compound of claim 1 wherein R is hydrogen.
3. The compound of claim 1 wherein R is acetyl.

References Cited by the Examiner

Applezweig: N. Steroid Drugs, McGraw-Hill Book Co., Inc. 1962, pp. 57 and 299.

LORRAINE A. WEINBERGER, *Primary Examiner.*

V. GARNER, *Assistant Examiner.*